United States Patent
Kim et al.

(10) Patent No.: US 7,368,198 B2
(45) Date of Patent: May 6, 2008

(54) POLYMER NANOCOMPOSITE MEMBRANE AND FUEL CELL USING THE SAME

(75) Inventors: Hae-kyoung Kim, Seoul (KR); Jae-sung Lee, Pohang-si (KR); Chang-houn Rhee, Pohang-si (KR); Hyuk Chang, Scongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 510 days.

(21) Appl. No.: 10/927,194

(22) Filed: Aug. 27, 2004

(65) Prior Publication Data
US 2005/0084728 A1    Apr. 21, 2005

(30) Foreign Application Priority Data
Aug. 29, 2003    (KR) .................. 10-2003-0060436

(51) Int. Cl.
   *H01M 8/10*    (2006.01)
   *C08J 5/20*    (2006.01)
(52) U.S. Cl. .......................... 429/33; 521/27
(58) Field of Classification Search .......... 429/42, 429/44, 46, 33; 521/27
   See application file for complete search history.

(56) References Cited

U.S. PATENT DOCUMENTS

| | | | |
|---|---|---|---|
| 5,795,496 A | 8/1998 | Yen et al. | 252/62.2 |
| 5,919,583 A | 7/1999 | Grot et al. | 429/33 |
| 6,194,474 B1 | 2/2001 | Kerres et al. | 521/27 |
| 6,510,047 B2 | 1/2003 | Meiners et al. | 361/115 |

FOREIGN PATENT DOCUMENTS

| | | |
|---|---|---|
| EP | 1 284 518 A1 | 2/2003 |
| EP | 1 309 025 A2 | 5/2003 |
| EP | 1 309 025 A3 | 12/2004 |
| JP | 2000-319013 | 11/2000 |
| JP | 2003-175340 | 6/2003 |
| JP | 2004-281178 | 10/2004 |
| KR | 1020040051287 | 6/2004 |

(Continued)

OTHER PUBLICATIONS

"Preparation and Performance of a Nafion®/montmorillonite Nanocomposite Membrane for Direct Methanol Fuel Cell" Journal of Power Sources, vol. 118, No. 1-2, May 25, 2003, pp. 205-211, D.H. Jung, et al.

(Continued)

*Primary Examiner*—Stephen Kalafut
*Assistant Examiner*—Thomas H. Parsons
(74) *Attorney, Agent, or Firm*—H.C. Park & Associates, PLC

(57) ABSTRACT

A hydrogen ionic conductive inorganic material having a layered structure, wherein a moiety containing a functional group with hydrogen ionic conductivity is introduced between layers of an inorganic material having a nano-sized interlayer distance. A polymer nanocomposite membrane including a reaction product of the hydrogen ionic conductive inorganic material and a conductive polymer, and a fuel cell using the same, are also provided. In the polymer nanocomposite membrane, a conductive polymer may be intercalated to a hydrogen ionic conductive inorganic material having a layered structure or products exfoliated from an inorganic material having a layered structure are dispersed in a conductive polymer.

23 Claims, 5 Drawing Sheets

FOREIGN PATENT DOCUMENTS

| | | |
|---|---|---|
| WO | WO 96/29752 | 9/1996 |
| WO | WO 97/19480 | 5/1997 |
| WO | WO 99/54389 | 10/1999 |
| WO | WO 00/74827 A2 | 12/2000 |
| WO | WO 00/74827 A3 | 12/2000 |
| WO | 00/074827 | 1/2003 |
| WO | 03-041091 | 5/2003 |
| WO | 2004-038839 | 5/2004 |

OTHER PUBLICATIONS

"Proton Exchange Nanocomposite Membranes Based on 3-Glycidoxypropyltrimethoxsilane, Silicotungstic Acid and Alpha-Zirconium Phosphate Hydrate" Solid State Ionics, vol. 145, No. 1-4, Dec. 1, 2001, pp. 149-160, Yong-Il Park, et al.

"Proton Conductivity of Phosphoric Acid Doped Polybenzimidazole and its Composites with Inorganic Proton Conductors" Journal of Membrane Science, vol. 226, No. 1-2, Dec. 1, 2003, pp. 169-184, Ronghuan He, et al.

-- PRIOR ART --

POLYMER NANOCOMPOSITE MEMBRANE AND FUEL CELL USING THE SAME

This application claims the benefit of Korean Patent Application No. 2003-60436, filed on Aug. 29, 2003, which is hereby incorporated by reference for all purposes as if fully set forth herein.

BACKGROUND OF THE INVENTION

1. Field of the Invention

The present invention relates to a polymer nanocomposite membrane and a fuel cell using the same, and more particularly, to a polymer nanocomposite membrane having a reduced permeability of water or methanol and a fuel cell using the same having improved energy density and fuel efficiency.

2. Discussion of the Related Art

Direct methanol fuel cells (DMFC) using a methanol solution as liquid fuel may be a future source of clean energy to replace fossil energy. Also, a DMFC may operate at room temperature, and it can be miniaturized and sealed. Thus, the DMFC may have multiple uses, including zero-emission vehicles, home power generating systems, mobile communication equipment, medical appliances, military equipment, aerospace industrial equipment, and portable electrical devices.

The DMFC produces direct current by an electrochemical reaction of methanol and oxygen. FIG. 1A shows a typical DMFC structure.

Referring to FIG. 1A, a hydrogen ionic conductive membrane 11 is interposed between an anode and a cathode.

The thickness of the hydrogen ionic conductive membrane 11 may be 50-200 μm, and it may be mainly made of a solid polymer electrolyte. Catalyst layers 12 and 13 are formed on an anode supporting layer 14 and a cathode supporting layer 15, respectively. The supporting layers 14 and 15 are made of carbon cloth or paper, and their surfaces are treated so that water to be transferred to the hydrogen ionic conductive membrane 11 and water generated by the reaction, can easily pass therethrough while supplying a reaction gas or liquid. Reference numeral 16 denotes a bipolar plate, which acts as a current collector, having grooves for injecting gas.

When a reaction fuel is supplied to the DMFC, an oxidation reaction occurs in the anode, converting methanol and water into carbon dioxides, hydrogen ions, and electrons. During this process, the hydrogen ions are transferred to the cathode via the hydrogen ionic conductive membrane 11.

On the other hand, a reduction reaction occurs in the cathode, wherein oxygen molecules in the air receive the electrons to be converted into oxygen ions. Then, the oxygen ions react with the hydrogen ions from the anode to be converted into water molecules.

In the above DMFC, the hydrogen ionic conductive membrane 11 may be a solid polymer membrane, and it separates fuels to be supplied to the anode and the cathode, while transferring the hydrogen ions produced in the anode to the cathode.

Nafion is typically used as the solid polymer membrane. The solid polymer membrane may contain water because it may be formed of a polymer that has a hydrophobic backbone and hydrophilic group-containing side chains. The water may form clusters that the hydrogen ions migrate through. Therefore, solid polymer membranes with increased water content may be preferred for effective hydrogen ion transfer.

In a DMFC fueled by an aqueous methanol solution, the solid polymer membrane may swell, depending on the fuels' methanol concentration. With this swelling, non-oxidized fuel may migrate from the anode to the cathode through the solid polymer membrane, thereby lowering the fuel cell's performance and wasting fuel.

In order to solve this problem, a solid polymer membrane may be developed for DMFCs.

U.S. Pat. Nos. 5,795,496, 6,194,474 and 6,510,047 disclose a method of lowering aqueous methanol solution permeability in a solid polymer membrane by using rigid and heat-resistant polymers. This method may significantly lower the methanol solution's permeability. However, since this method may considerably reduce the polymer membrane's ionic conductivity, the fuel cell's performance, such as power density, may be considerably lowered.

U.S. Pat. No. 5,919,583 discloses a method for forming a solid polymer membrane with dispersed inorganic particles. According to this method, the added inorganic materials may lower the membrane's hydrogen ionic conductivity.

SUMMARY OF THE INVENTION

This invention provides a solid polymer membrane that, compared with a conventional membrane, may have a slightly reduced permeability of methanol while possessing the same or higher ionic conductivity, a material for forming the same, and a method of preparing the same.

This invention also provides a fuel cell having improved fuel efficiency by using the solid polymer membrane as described above.

Additional features of the invention will be set forth in the description which follows, and in part will be apparent from the description, or may be learned by practice of the invention.

The present invention discloses a hydrogen ionic conductive inorganic material having a layered structure, wherein a moiety containing a functional group with hydrogen ionic conductivity is introduced between layers of an inorganic material having a nano-sized interlayer distance.

This present invention also discloses a method of preparing a hydrogen ionic conductive inorganic material having a layered structure. An inorganic material having a nano-sized interlayer distance is reacted with an alkoxysilane containing a hydrolysable alkoxy group and a free thiol group to form a reaction product. An oxidation is conducted by adding an oxidizing agent to the reaction product, followed by a protonation of the reaction product.

This present invention also discloses a polymer nanocomposite membrane including a reaction product of a hydrogen ionic conductive inorganic material having a layered structure and a conductive polymer.

This present invention also discloses a method of preparing a polymer nanocomposite membrane. A mixture of a hydrogen ionic conductive inorganic material having a layered structure is reacted with a conductive polymer at the temperature of 60-150° C., followed by forming a membrane.

This present invention also discloses a fuel cell using a polymer nanocomposite membrane that includes a reaction product of a hydrogen ionic conductive inorganic material having a layered structure and a conductive polymer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

In a hydrogen ionic conductive inorganic material having a layered structure according to an exemplary embodiment of the present invention, a moiety containing a functional group with hydrogen ionic conductivity is between layers of an inorganic material having a nano-sized interlayer distance.

The moiety containing a functional group with hydrogen ionic conductivity may be at least one selected from the group consisting of a sulfonic acid group containing moiety, a carboxylic acid group containing moiety, or a $H_3PO_4$ containing moiety.

The sulfonic acid group containing moiety may be a silicate connected to the inorganic material via ether bond, and it may have a free thiol group at the terminal. The sulfonic acid group containing moiety may be obtained by hydrolysis of alkoxysilanes having a hydrolysable alkoxy group and a thiol group, dehydration and polycondensation of the hydrolyzed product.

Figure 1A:
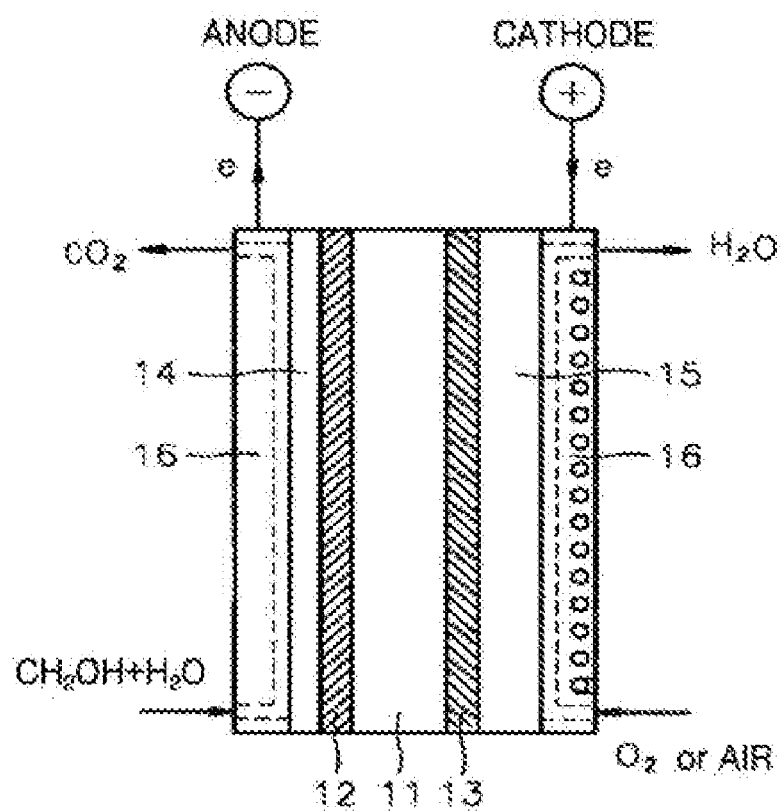
FIG. 1A is a plan view of a typical direct methanol fuel cell structure.
Figure 1B:
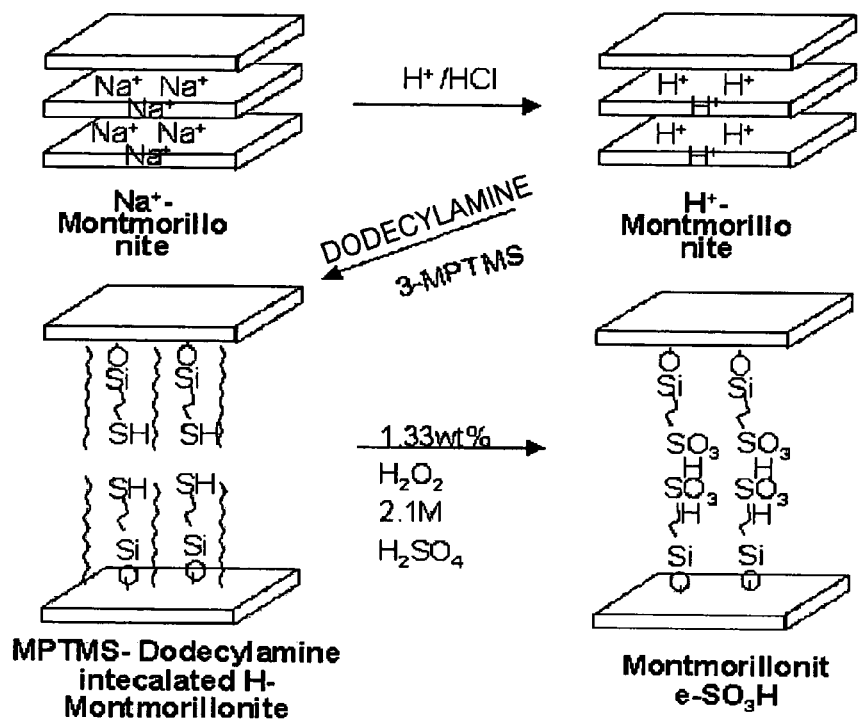
FIG. 1B shows a process of preparing a hydrogen ionic conductive inorganic material having a layered structure according to an exemplary embodiment of the present invention.

FIG. 1B shows a process of preparing a hydrogen ionic conductive inorganic material. For example, a montmorillonite may be used as the inorganic material having a nano-sized interlayer distance, and a moiety containing sulfonic acid group may be used as the moiety containing a functional group with hydrogen ionic conductivity.

Referring to FIG. 1B, treating the montmorillonite with acid may replace $Na^+$, which is present in between layers, with $H^+$. The resulting product may then be reacted with an alkoxysilane, such as 3-mercapto prophyl trimethoxysilane (3-MPTMS), introducing a moiety, having a free thiol group at the terminal, connected through ether bond to one inner surface of the montmorillonite. Alternatively, before reacting the resulting product with alkoxysilane, it may be reacted with a surfactant, such as dodecylamine, to increase the distance between montmorillonite layers.

After introducing a moiety connected to one inner surface of the montmorillonite through ether bond and having a free thiol group at the terminal, the resulting product may be oxidized with an oxidizing agent, and it may be protonated to convert the free thiol group at the terminal into a sulfonic acid group, thereby obtaining an inorganic material having hydrogen ionic conductivity.

Examples of the inorganic material having a nano-sized interlayer distance include, but are not limited to, montmorillonite, hydrated sodium calcium aluminium magnesium silicate hydroxide, pyrophyllite, talc, vermiculite, sauconite, saponite, nontronite, Amesite, Baileychlore, Chamosite, Clinochlore, Cookeite, Corundophilite, Daphnite, Delessite, Gonyerite, Nimite, Odinite, Orthochamosite, Penninite, Pannantite, Rhipidolite, prochlore, Sudoite, Thuringite, kaolinite, dickite and nacrite.

A method of preparing the hydrogen ionic conductive inorganic material having a layered structure may be as follows.

First, an inorganic material having a nano-sized interlayer distance may be pre-treated, for example, using an acid, and it may be reacted with an alkoxysilane having a hydrolysable alkoxy group and a free thiol group. Through the hydrolysis of the alkoxysilane, and dehydration and polycondensation of the hydrolysed product, silicate, which is connected to one inner surface of the inorganic material via ether bond and has a free thiol group at the terminal, may be introduced between the inorganic material's layers.

The inorganic material having a nano-sized interlayer distance may have the particle size of hundreds nano-size and the interlayer distance in the range of about 0.1 nm to about 10 nm.

Examples of the alkoxysilane containing a hydrolysable alkoxy group and a thiol group include, but are not limited to, 3-mercapto propyl trimethoxysilane (3-MPTMS), 3-mercapto propyl methyl dimethoxysilane (3-MPDMS), or a mixture thereof. The alkoxysilane content may be in the range of about 0.1 to about 1.0 mole based on 1 mole of the inorganic material having a nano-sized interlayer distance. When the alkoxysilane content is less than 0.1 mole, the inorganic material's ion exchange capacity (IEC) may be too low. On the other hand, when the alkoxysilane is greater than 1.0 mole, it may be excessively saturated, thereby increasing processing cost.

The inorganic material and the alkoxysilane reaction may be carried out in the range of about 100 to about 180° C. Outside of this temperature range, the reactants may decompose or no reaction may occur.

A solvent to dissolve or disperse the inorganic material may be required in the reaction of the inorganic material and the alkoxysilane. Examples of such solvent include toluene, hexane and DMF. The solvent's content may be in the range of about 50 to about 150 parts by weight based on 100 parts by weight of the inorganic material.

On the other hand, in order to maintain an appropriate distance between the inorganic material layers and the acidity of the chemical reaction, the inorganic material may be pre-treated, before reacting it with the alkoxysilane, by adding a surfactant thereto. The surfactant, particularly a non-ionic surfactant, may be dodecylamine, cetyltrimethylammonium bromide, dodecyltrimethylammonium bromide, tetrabutylammonium hydroxide, and a mixture of them. The surfactant content may be in the range of about 0.1 to about 1.0 mole based on 1 mole of the inorganic material.

The reaction product of the inorganic material and the alkoxysilane may then be reacted with an oxidizing agent and protonated to convert the free thiol group at the terminal into a sulfonic acid group. As a result, a hydrogen ionic conductive inorganic material having a layered structure may be completed.

$H_2O_2$, $K_2O_2$, or $BaO_2$ may be used as the oxidizing agent, and its content may be in the range of about 0.5 to about 5 moles based on 1 mole of the inorganic material.

The oxidation may be carried out at a temperature in the range of about 25 to about 80° C. When the temperature is outside this range, oxidation may not occur or decomposition may occur.

A precursor having a sulfonic group or a carboxylic group, or a substance that can be substituted with a sulfonic group or a carboxylic group through oxidation, may be used instead of the alkoxysilane. In this case, a carboxylic group and a phosphoric acid group, which have hydrogen ionic conductivity, may be introduced between the inorganic material layers. Use of the precursor determines the conductivity and ion exchange capacity of the hydrogen ionic conductive inorganic material.

The hydrogen ionic conductive inorganic material having a layered structure according to an exemplary embodiment of the present invention may have a distance in the range of about 0.1 nm to about 50 nm between layers, the length of the inorganic material may be in the range of about 10 μm to about 100 μm, and the IEC may be in the range of about 0.01 mmol/g to about 5 mmol/g.

In the protonation, sulfuric acid, phosphoric acid or an alkylcarboxylic acid, such as acetic acid, may be added and stirred at room temperature for a predetermined period.

The hydrogen ionic conductive inorganic material having a layered structure obtained according to the above process may then be purified and dried, and thereafter used in forming a polymer nanocomposite membrane.

A polymer nanocomposite membrane according to an exemplary embodiment of the present invention may be prepared by reacting the above hydrogen ionic conductive inorganic material and a conductive polymer. Specifically, the hydrogen ionic conductive material and a conductive polymer may be rapidly mixed and stirred at a temperature in the range of about 60 to about 150° C. for 12 hours or longer, and then reacted. Although the reaction time may vary depending on the reaction temperature, the reaction may be carried out for two days. When the reaction temperature is less than 60° C., the reactivity of the polymer and the inorganic material decreases. On the other hand, when it is greater than 150° C., the inorganic material tends to decompose.

More particularly, the polymer nanocomposite membrane according to an exemplary embodiment of the present invention may be prepared by mixing the inorganic material and a conductive polymer in a predetermined ratio of mixing, and reacting at a higher temperature and pressure (about 80° C. and 1-5 atm) for 12 hours or longer in autoclave. Alternatively, the polymer nanocomposite membrane may be prepared by mixing the inorganic material and a conductive polymer solution, and then mixing for 30 minutes or longer through a homogenizer, thereafter reacting at 60-150° C.

After completing the reaction of the hydrogen ionic conductive inorganic material with the conductive polymer, the reaction mixture may be poured into a polymer membrane frame and retained in the oven at a temperature range of about 40 to about 150° C., in particular, about 80 to about 150° C., thereby obtaining a polymer nanocomposite membrane.

Examples of the conductive polymer include, but are not limited to, perfluorinated sulfonic acid polymer (for example, perfluorinated aliphatic sulfonic acid polymer or perfluorinated aromatic sulfonic acid polymer), sulfonated polyimide, sulfonated polyetherketone, sulfonated polystyrene, sulfonated polysulfone, and a combination of the foregoing polymers. The conductive polymer's IEP may be in the range of about 0.01 to about 5 mmol/g.

The conductive polymer content may be in the range of about 500 to about 10,000 parts by weight based on 100 parts by weight of the hydrogen ionic conductive inorganic material having a layered structure. When the conductive polymer content is outside this range, the ability of forming a polymer membrane may be lowered.

The polymer nanocomposite membrane prepared according to the above process may have a thickness of about 50 to about 200 μm, which allows it to be used in a fuel cell.

The polymer nanocomposite membrane according to an exemplary embodiment of the present invention may be used as a hydrogen ionic conductive membrane in a fuel cell such as that as shown in FIG. 1A.

Pre-treating the polymer nanocomposite membrane before using it in a fuel cell may result in more efficient performance. The polymer nanocomposite membrane may be pre-treated by boiling it in deionised water for 2 hours, or by boiling it in sulfuric acid for 2 hours and then boiling it in deionised water.

A process of fabricating a membrane and electrode assembly for a fuel cell using the pre-treated polymer nanocomposite membrane may be as follows. The term "membrane and electrode assembly (MEA)" refers to a structure having a hydrogen ionic conductive polymer membrane located in the center with a catalyst layer and an electrode sequentially laminated on both sides thereof.

The MEA of the present invention may be formed by positioning an electrode, which may also have a catalyst layer, on both sides of the polymer membrane, and then joining it at a high temperature and pressure. Alternatively, the MEA of the present invention may be formed by coating the polymer membrane with a catalyst metal that assists an electrochemical catalytic reaction, and then joining a fuel diffusing layer thereto.

The joining temperature and pressure are a temperature at which the hydrogen ionic conductive membrane may be softened (in the case of Nafion, to about 125° C.) and a pressure of 0.1 to 1.2 ton/cm$^2$, in particular, about 1 ton/cm$^2$. The electrode may be a conductive carbon cloth or paper layer. Bipolar plates on each side of the MEA complete the fuel cell. The bipolar plates may have grooves for supplying fuel, and they may act as a current collector.

In preparing the MEA, Pt alone, an alloy, or a mixture of Pt and at least one metal among Au, Pd, Rh, Ir, Ru, Sn and Mo may be used as the catalyst.

Exemplary embodiments of the present invention will be described in greater detail with reference to the following examples. The following examples are for illustrative purposes and are not intended to limit the scope of the invention.

EXAMPLE 1

First, montmorillonite, as an inorganic material having a nano-sized interlayer distance, was used to prepare a hydrogen ionic conductive inorganic material as follows.

150 ml of toluene was added to a 500 ml round-bottom flask and purged with $N_2$, followed by adding 49 mmol of montmorillonite and stirring. Then, 24.50 mmol (4.63 g) of 3-mercapto propyl trimethoxysilane was added to the mixture. The reaction mixture was mixed at room temperature for 1 hour, followed by raising the temperature thereof to 100° C. and mixing for 24 hours. The reaction mixture was cooled, filtrated, and washed with ethanol, followed by drying in an oven at 60° C.

The dried product was added to a 100 ml flask containing 8.33 g of hydrogen peroxide and mixed at room temperature for 6 hours. After raising the reaction mixture temperature to 70° C., the reaction was carried out for 1 hour.

After completing the above reaction, the resulting product was filtrated, washed with water, and dried at room temperature. The dried product was poured in 10 wt % aqueous solution of sulfuric acid and stirred at room temperature for 30 minutes, followed by filtrating, washing and drying to prepare a hydrogen ionic conductive inorganic material.

EXAMPLE 2

A hydrogen ionic conductive inorganic material was prepared in the same manner as in Example 1, except that before adding 24.50 mmol (4.63 g) of 3-mercapto propyl trimethoxysilane to the reaction mixture, 24.5 mmol of dodecyl amine was added to the reaction mixture.

EXAMPLE 3

A hydrogen ionic conductive inorganic material was prepared in the same manner as in Example 1, except that before adding 24.50 mmol (4.63 g) of 3-mercapto prophyl trimethoxysilane to the reaction mixture, 24.5 mmol of cetyltrimethylammonium bromide was added to the reaction mixture.

EXAMPLE 4

A hydrogen ionic conductive inorganic material was prepared in the same manner as in Example 1, except that before adding 24.50 mmol (4.63 g) of 3-mercapto prophyl trimethoxysilane to the reaction mixture, 24.5 mmol of dodecyltrimethylammonium bromide was added to the reaction mixture.

EXAMPLE 5

A hydrogen ionic conductive inorganic material was prepared in the same manner as in Example 1, except that before adding 24.50 mmol (4.63 g) of 3-mercapto prophyl trimethoxysilane to the reaction mixture, 24.5 mmol of tetrabutylammonium hydroxide was added to the reaction mixture.

EXAMPLE 6

0.03 g of the hydrogen ionic conductive inorganic material obtained from Example 3 was thoroughly mixed with 20 g of 5 wt % copolymer solution of tetrafluoroethylene and perfluoro-3,6-dioxa-4-methyl-7-octenesulfonyl fluoride and heated to 90° C., followed by vigorous stirring at a rate of 900 rpm. Next, the reaction mixture was stirred for 3 days and transferred to a polymer membrane frame, followed by heating in an oven controlled at 130° C. for 4 hours to prepare a polymer nanocomposite membrane.

EXAMPLE 7

0.03 g of the hydrogen ionic conductive inorganic material obtained from Example 3 was thoroughly mixed with 20 g of 5 wt % copolymer solution of tetrafluoroethylene and perfluoro-3,6-dioxa-4-methyl-7-octenesulfonyl fluoride solution. Next, the mixture was put in autoclave and reacted at 90° C. and 80 psi for 24 hours.

After completing the reaction, the resulting product was transferred to a polymer membrane frame and heat-treated in an oven controlled at 130° C. for 4 hours, thereby preparing a polymer nanocomposite membrane.

EXAMPLE 8

0.03 g of the hydrogen ionic conductive material obtained from Example 3 was thoroughly mixed with 20 g of 3 wt % copolymer solution of tetrafluoroethylene and perfluoro-3,6-dioxa-4-methyl-7-octenesulfonyl fluoride.

Next, the mixture was stirred using a homogenizer at a rate of 10000 rpm for 30 minutes, and then reacted at 90° C. for 12 hours.

After completing the reaction, the resulting product was transferred to a polymer membrane frame and heat-treated in an oven controlled at 130° C. for 4 hours, thereby preparing a polymer nanocomposite membrane.

EXAMPLE 9

0.03 g of the hydrogen ionic conductive material obtained from Example 3 was thoroughly mixed with 20 g of 5 wt % copolymer solution of tetrafluoroethylene and perfluoro-3,6-dioxa-4-methyl-7-octenesulfonyl fluoride, followed by heating to 90° C. and vigorous stirring at a rate of 900 rpm. Next, the reaction mixture was reacted for 3 days and transferred to a polymer membrane frame, followed by heat-treating in an oven controlled at 130° C. for 4 hours to prepare a polymer nanocomposite membrane.

EXAMPLE 10

0.03 g of the hydrogen ionic conductive material obtained from Example 3 was thoroughly mixed with 20 g of 10 wt % perfluorinated sulfonic acid solution, followed by heating to 90° C. and vigorous stirring at a rate of 900 rpm. Next, the reaction mixture was reacted for 3 days and transferred to a polymer membrane frame. The frame was heat-treated in an oven controlled at 130° C. for 4 hours to prepare a polymer nanocomposite membrane.

EXAMPLE 11

An MEA was prepared using the polymer nanocomposite membrane obtained from Example 8 and used to prepare a direct methanol fuel cell, fueled by a 2M methanol solution and air.

Comparative Example 1

A commercial Nafion 115 membrane was used to prepare a MEA. This MEA was used to prepare a direct methanol fuel cell, fuelled by a 2M methanol solution and air.

The MEAs of Example 11 and Comparative Example 1 were applied to fuel cells to evaluate their properties as follows.

Figure 2:
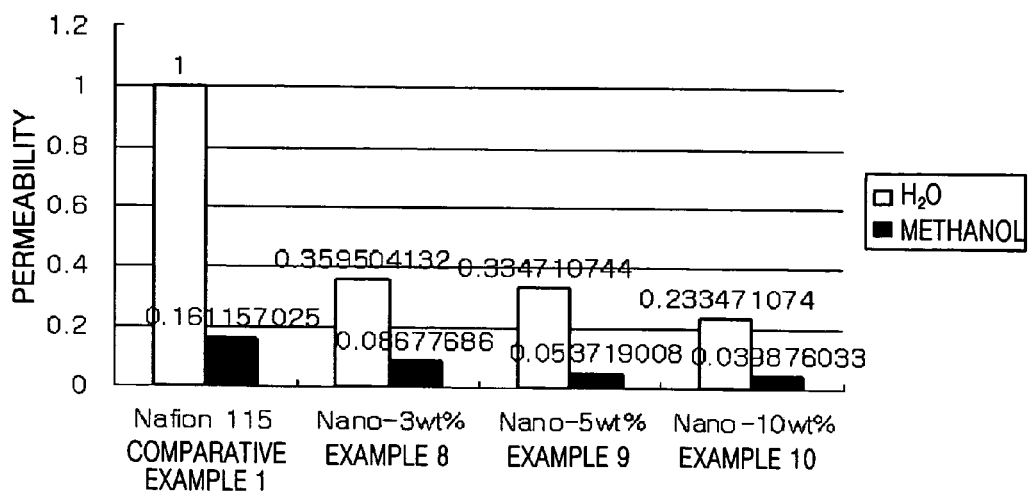
FIG. 2 shows water and methanol permeability in the polymer nanocomposite membrane of Examples 8, 9 and 10 and the polymer membrane of Comparative Example 1.

The permeability of water and methanol in the polymer nanocomposite membranes of Examples 8, 9 and 10 and the polymer membrane in Comparative Example 1 were measured. FIG. 2 shows the results.

Referring to FIG. 2, the polymer nanocomposite membranes of Examples 8, 9 and 10 have a lower permeability than the polymer membrane of Comparative Example 1.

Figure 3:
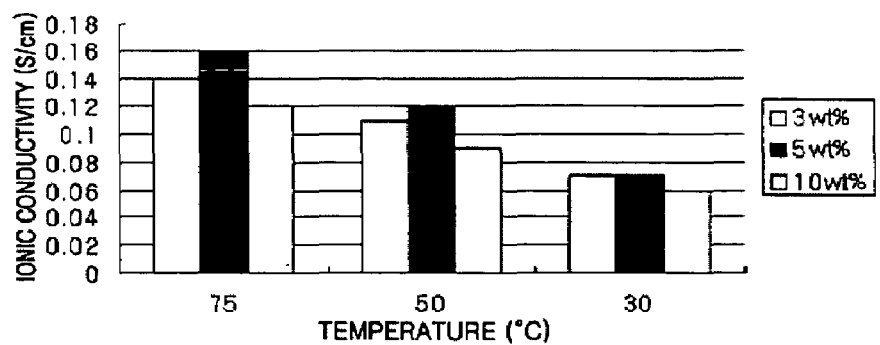
FIG. 3 shows the ionic conductivity of a polymer nanocomposite membrane of Examples 8, 9 and 10.

The ionic conductivity of the polymer membranes prepared in Examples 8, 9 and 10 was measured using a 4-point probe method, and FIG. 3 shows the results.

As apparent from FIG. 3, at a temperature of 75° C., the ionic conductivity of the polymer membranes of Examples 8, 9 and 10 is higher than 0.1 S/cm, which is the typical ionic conductivity of a conventional fuel cell.

The energy density of the fuel cells prepared by using MEAs of Example 11 and the Nafion 115 membrane of Comparative Example 1 was measured, and FIG. shows the results.

Figure 4:
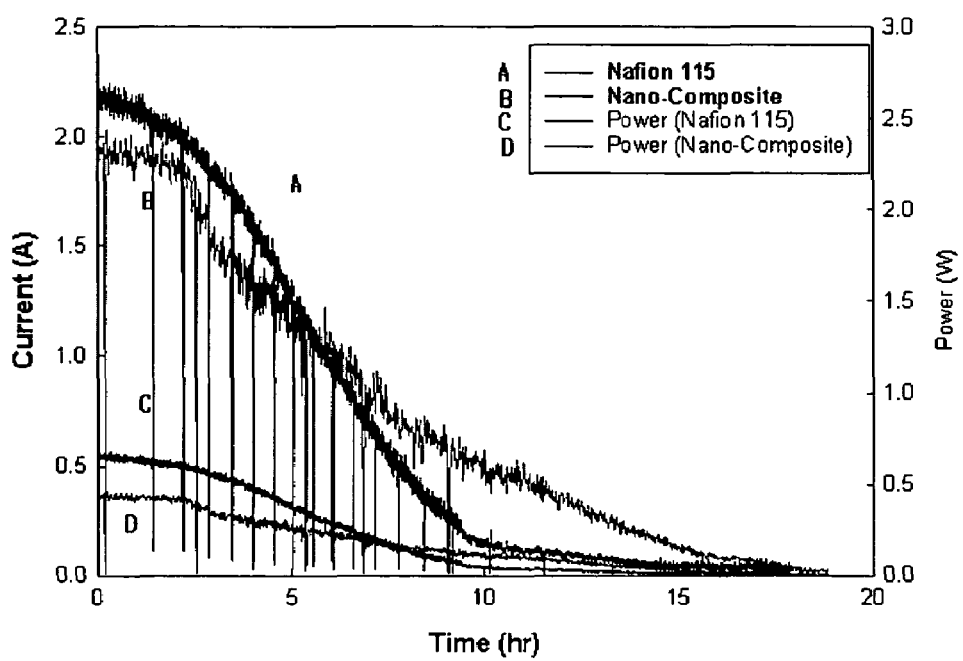
FIG. 4 shows the energy density in the fuel cells of Example 11 and Comparative Example 1.

As apparent from FIG. 4, the fuel cell of Example 11 may have an increased energy density compared to the fuel cell of Comparative Example 1. In FIG. 4, A (Nafion 115) shows a change in current over time when applying the MEA using Nafion 115 to a fuel cell, B (nanocomposite membrane) shows a change in current over time when applying the MEA using a nanocomposite membrane to a fuel cell, C (Nafion 115) shows a change in power of the MEA using Nafion 115 over time, and D (nanocomposite membrane) shows a change in power of the MEA using a nanocomposite membrane over time.

Figure 5:
FIG. 5 is a cross-sectional view of a polymer nanocomposite membrane of Example 11.

The distribution state of the nanocomposite membrane used in Example 11 was investigated using TEM, and FIG. 5 shows the results.

From FIG. 5, the intercalation and exfoliation of the montmorillonite may be observed through a morphology of the polymer membrane.

Figure 6:
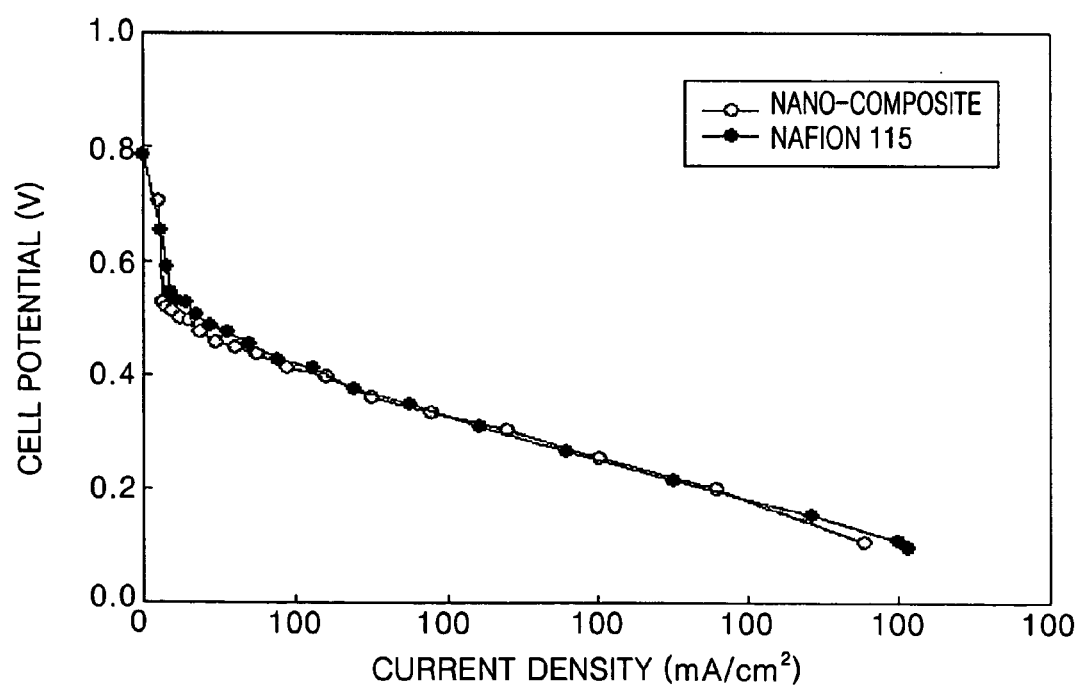
FIG. 6 shows the performance of membrane and electrode assemblies (MEAs) of Example 11 and Comparative Example 1.

Additionally, the performance of the MEAs prepared in Example 11 and Comparative Example 1 was investigated, and FIG. 6 shows the results.

Figure 7:
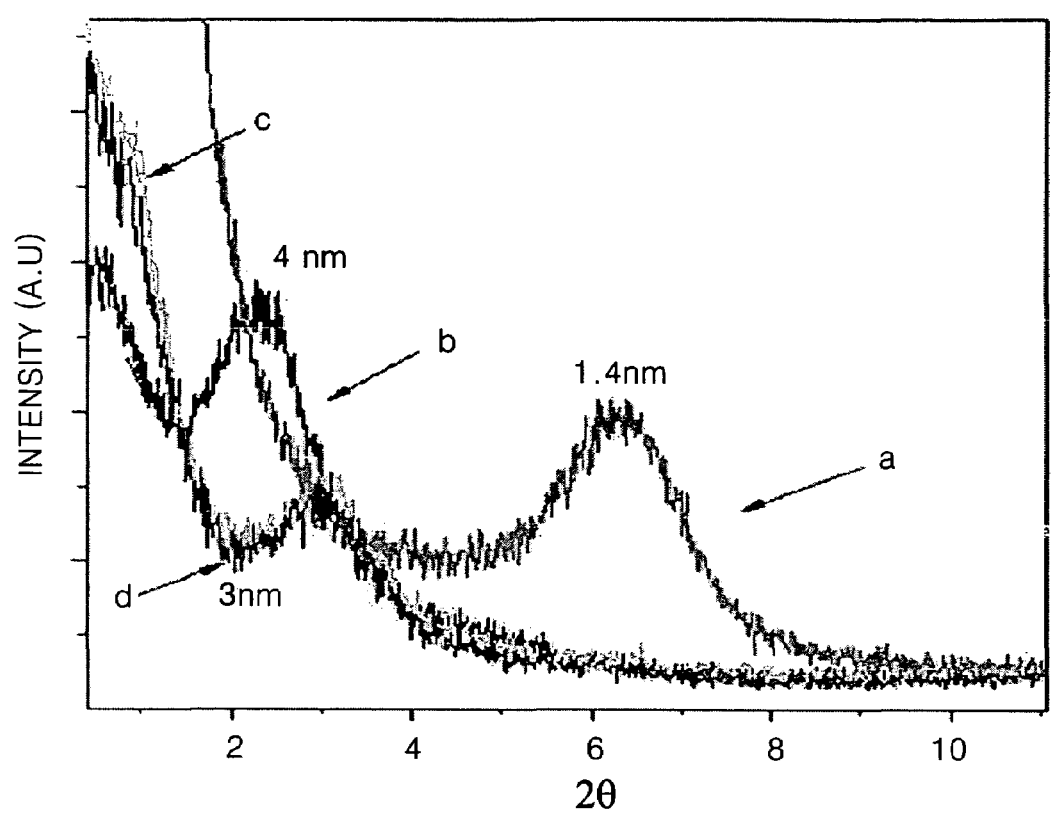
FIG. 7 shows X-ray diffraction (XRD) analysis results of a polymer nanocomposite membrane of Example 11 and a montmorillonite.

The distribution state of the nanocomposite membrane used in Example 11 was investigated using XRD, and FIG. 7 shows the result. In FIG. 7, "a" represents a distribution state of montmorillonite, and "b", "c" and "d" represent distribution states of polymer nanocomposite membranes formed by using montmorillonite. As apparent from FIG. 7, the interlayer distance of an inorganic material in a polymer nanocomposite membrane formed by using montmorillonite may be wider than the interlayer distance of montmorillonite.

In a polymer nanocomposite membrane according to another exemplary embodiment of the present invention, conductive polymers may be intercalated to a hydrogen ionic conductive inorganic material having a layered structure, or products exfoliated from a hydrogen ionic conductive inorganic material having a layered structure are dispersed in a conductive polymer. The polymer nanocomposite membrane according to exemplary embodiments of the present invention may control the degree of swelling in a methanol solution, thereby decreasing the permeability from swelling. Furthermore, a functional group having a hydrogen ionic conductivity may be introduced in the inorganic material having a layered structure, thereby increasing a hydrogen ionic conductivity of the polymer nanocomposite membrane. Additionally, when the polymer nanocomposite membrane is used as a hydrogen ionic conductive membrane in a fuel cell, the fuel cell's energy density and efficiency may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A hydrogen ionic conductive inorganic material having a layered structure, comprising a moiety containing functional group with hydrogen ionic conductivity between layers of an inorganic material having a nano-sized interlayer distance,
   wherein the moiety is a sulfonic acid group containing moiety, the sulfonic acid group containing moiety being a silicate connected to the inorganic material having a nano-sized interlayer distance through ether bond (—O—) and has a free thiol group at a terminal.

2. The hydrogen ionic conductive inorganic material having a layered structure of claim 1, wherein the sulfonic acid group containing moiety is obtained by hydrolysis of an alkoxysilane, which contains a hydrolysable alkoxy group and a thiol group, dehydration and polycondensation of the hydrolyzed product.

3. The hydrogen ionic conductive inorganic material having a layered structure of claim 2, wherein the alkoxysilane is at least one selected from the group consisting of 3-mercaptopropyl trimethoxysilane or 3-mercaptopropylmethyldimethoxysilane.

4. The hydrogen ionic conductive inorganic material having a layered structure of claim 1, wherein the inorganic material having a nano-sized interlayer distance is at least one selected from the group consisting of montmorillonite, hydrated sodium calcium aluminum magnesium silicate hydroxide, pyrophyllite, talc, vermiculite, sauconite, saponite, nontronite, Amesite, Baileychlore, Chamosite, Clinochlore, Cookeite, Corundophilite, Daphnite, Delessite, Gonyerite, Nimite, Odinite, Orthochamosite, Penninite, Pannantite, Rhipidolite, prochlore, Sudoite, Thuringite, kaolinite, dickite, or nacrite.

5. The hydrogen ionic conductive inorganic material having a layered structure of claim 1, wherein the interlayer distance of the inorganic material having a nano-sized interlayer distance is in the range of 0.1-10 nm.

6. The hydrogen ionic conductive inorganic material having a layered structure of claim 1, further comprising a surfactant.

7. The hydrogen ionic conductive inorganic material having a layered structure of claim 6, wherein the surfactant is at least one selected from the group consisting of dodecylamine, cetyltrimethylammonium bromide, dodecyltrimethylammonium bromide, or tetrabutylammonium hydroxide.

8. The hydrogen ionic conductive inorganic material having a layered structure of claim 1, wherein the interlayer distance of the hydrogen ionic conductive inorganic material having a layered structure is in the range of 0.1-50 nm.

9. A method of preparing a hydrogen ionic conductive inorganic material having a layered structure, comprising the steps of:
   reacting an inorganic material having a nano-sized interlayer distance with an alkoxysilane containing a hydrolysable alkoxy group and a free thiol group to form a reaction product; and
   conducting an oxidation by adding an oxidizing agent to the reaction product, followed by a protonation of the reaction product.

10. The method of claim 9, further comprising the step of adding a surfactant to the inorganic material having a nano-sized interlayer distance, before reacting the inorganic material having a nano-sized interlayer distance with the alkoxysilane.

11. The method of claim 10, wherein the surfactant is at least one selected from the group consisting of dodecylamine, cetyltrimethylammonium bromide, dodecyltrimethylammonium bromide, or tetrabutylammonium hydroxide.

12. The method of claim 9, wherein the temperature of the reaction is in the range of 100-180° C.

13. The method claim 9, wherein the oxidizing agent is one of $H_2O_2$, $K_2O_2$, or $BaO_2$.

14. The method claim 9, wherein an oxidation reaction temperature of the oxidation is in the range of 25-80° C.

15. The method of claim 9, wherein one of a sulfuric acid, a phosphoric acid, or an acetic acid is used in the protonation.

16. A polymer nanocomposite membrane, comprising a reaction product of:
   a hydrogen ionic conductive inorganic material having a layered structure, further comprising a moiety containing functional group with hydrogen ionic conductivity between layers of an inorganic material having a nano-sized interlayer distance; and
   a conductive polymer,
   wherein the moiety is a sulfonic acid group containing moiety, the sulfonic acid group containing moiety being a silicate connected to the inorganic material having a nano-sized interlayer distance through ether bond (—O—) and has a free thiol group at a terminal.

17. The polymer nanocomposite membrane of claim 16, wherein the conductive polymer is intercalated between layers of a hydrogen ionic conductive inorganic material, products exfoliated from each layer of a hydrogen ionic conductive inorganic material are dispersed in the conductive polymer, or above structures are coexistent.

18. The polymer nanocomposite membrane of claim 16, wherein the conductive polymer is at least one selected from the group consisting of perfluorinated sulfonic acid polymer, sulfonated polyimide, sulfonated polyetherketone, sulfonated polystyrene, or sulfonated polysulfone.

19. The polymer nanocomposite membrane of claim 16, wherein an amount of the conductive polymer is in a range of 500-10,000 parts by weight based on 100 parts by weight of the hydrogen ionic conductive inorganic material.

20. A method of preparing a polymer nanocomposite membrane, comprising reacting a mixture of a hydrogen ionic conductive inorganic material having a layered structure and a conductive polymer at a temperature in the range of 60-150° C., followed by forming the polymer nanocomposite membrane,
   wherein the hydrogen ionic conductive inorganic material comprises a moiety, the moiety being a sulfonic acid group containing moiety, the sulfonic acid group containing moiety being a silicate connected to the inorganic material having a nano-sized interlayer distance through ether bond (—O—) and has a free thiol group at a terminal.

21. The method of claim 20, wherein the step of forming the polymer nanocomposite membrane includes placing the reaction product of the mixture of the hydrogen ionic conductive inorganic material and the conductive polymer in a frame for polymer membrane and heating it at a temperature in the range of 40-150° C.

22. A fuel cell using a polymer nanocomposite membrane comprising a reaction product of a hydrogen ionic conductive inorganic material having a layered structure and a conductive polymer,
   wherein the hydrogen ionic conductive inorganic material comprises a moiety, the moiety being a sulfonic acid group containing moiety, the sulfonic acid group containing moiety being a silicate connected to the inorganic material having a nano-sized interlayer distance through ether bond (—O—) and has a free thiol group at a terminal.

23. The fuel cell of claim 22, wherein the fuel cell is a direct methanol fuel cell.

* * * * *